Aug. 7, 1928.
J. K. WRIGHT
1,679,886
AUTO TOP AND COVER
Filed May 24, 1926    2 Sheets-Sheet 1
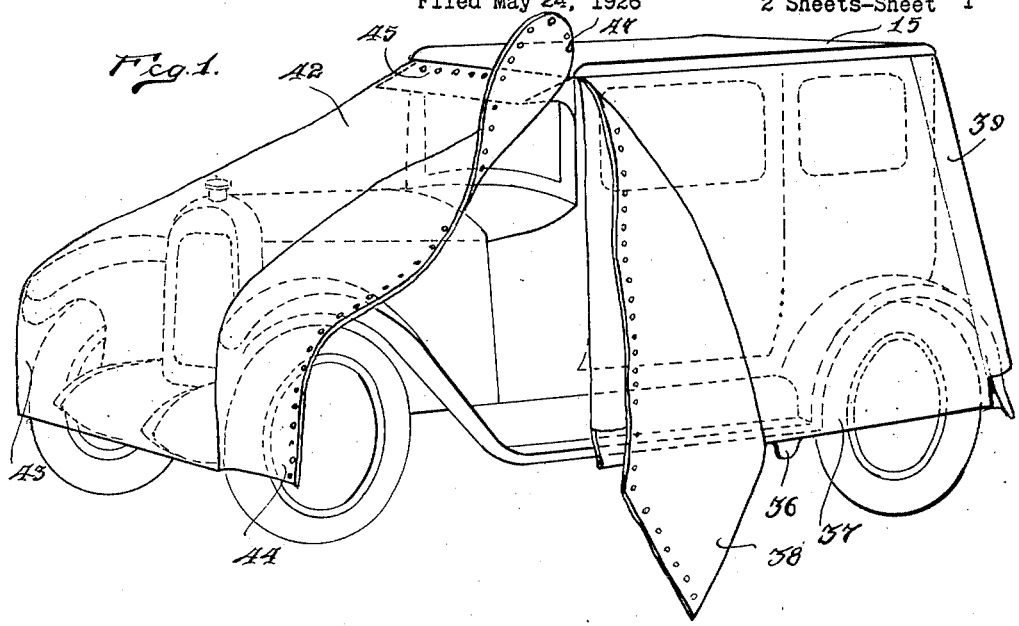
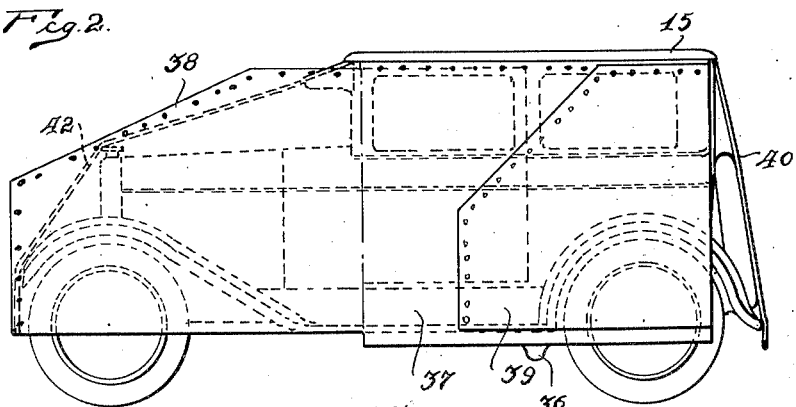
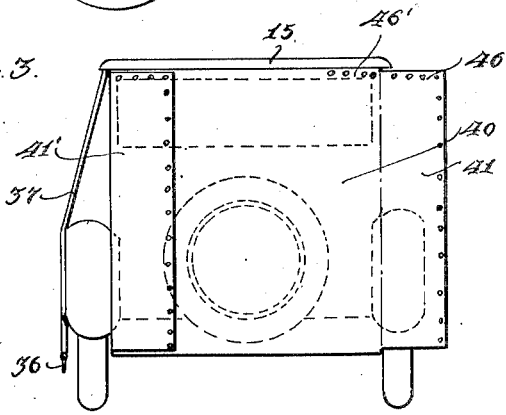
INVENTOR.
John K. Wright.
BY
ATTORNEY.

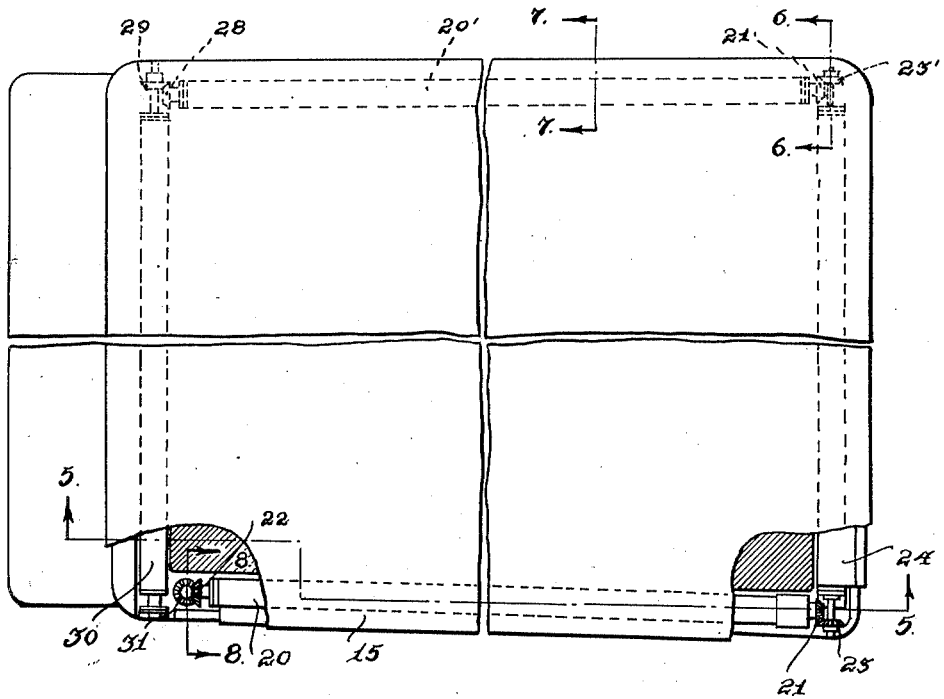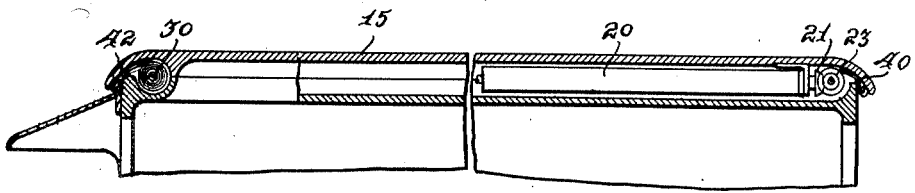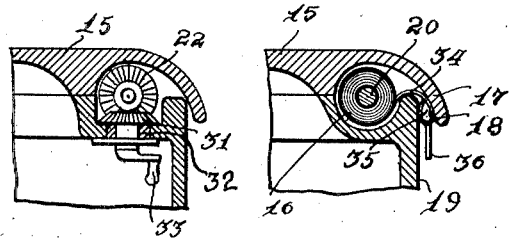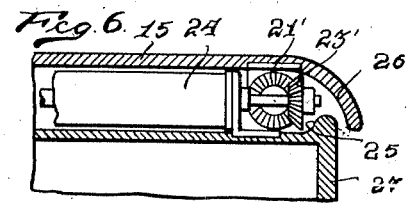

Patented Aug. 7, 1928.

1,679,886

UNITED STATES PATENT OFFICE.

JOHN K. WRIGHT, OF DETROIT, MICHIGAN.

AUTO TOP AND COVER.

Application filed May 24, 1926. Serial No. 111,198.

This invention relates to a new and useful improvement in an auto cover and has for its object the provision of a cover which may be concealed inside the top of the automobile body when not in use and easily and quickly adjusted to operative position so as to completely cover and enclose the car to protect it from the elements, thus giving to the finish of the car a longer life.

Another object of the invention is the provision of a device of this class which is simple in structure, economical of manufacture and highly efficient in use.

Another object of the invention is the provision of a mechanism for rolling the covering members into concealed position, so coordinated and arranged that the various portions of the covering will be concealed simultaneously with each other.

Another object of the invention is the provision of a cover of this class having a plurality of flaps mounted on a main body, so constructed that the flaps when rolled to inoperative position will occupy a minimum amount of space and effect to a minimum degree the appearance of the automobile.

Other objects will appear hereinafter.

Fig. 1 is a perspective view of an automobile embodying the invention.

Fig. 2 is a side elevational view.

Fig. 3 is a rear elevational view.

Fig. 4 is a fragmentary view of the top with portions broken away.

Fig. 5 is a section taken on substantially line 5—5 of Fig. 4.

Fig. 6 is a sectional view taken on substantially line 6—6 of Fig. 4.

Fig. 7 is a sectional view taken on substantially line 7—7 of Fig. 4.

Fig. 8 is a sectional view taken on substantially line 8—8 of Fig. 4.

As shown in the drawings the invention is adapted for use as a cover for automobiles and particularly that type having a closed body. Formed at opposite sides at the top 15 is a longitudinally extending pocket 16, over which the ledge 17 of the top hangs, leaving a space 18 between the ledge 17 and the side wall 19 of the body. Positioned in each of the pockets 16 is a roller 20 of any well known type carrying at one end a bevel gear 21 and at the opposite end a bevel gear 22. The bevel gear 21 meshing with a bevel gear 23 carried by a transversely extending roller 24 which is positioned in a pocket 25, the ledge 26 of the top overhanging the back 27. A similar gear 23' is carried by the roller 24 and serves to mesh with the gear 21' carried by the roller 20', the opposite end of which carries a bevel gear 28, meshing with the gear 29, the gear 29 being carried by transversely extending roller 30.

The rollers are provided with suitable curtains some of which are flap bearing and some of which are foldable upon themselves. The arrangement, as will appear from the description is such that the curtains when folded to proper position may be simultaneously rolled upwardly into the pocket so as to be concealed from view. When desired these curtains may be drawn outwardly to afford a complete covering or shield for the automobile to protect it from the elements as mentioned.

Mounted in a suitable bearing 32 on the top 15 is a bevel bear 31 adapted to mesh with the bevel gear 22, a suitable crank 33 being provided for rotating the gear 31. The structure is such that upon a rotation of the gear 31 the rollers 30, 20, 24 and 20' are rotated to wind or unwind the curtains which are fastened thereon. The curtain at each side of the frame is similarly constructed and similarly operated so that the curtain mounted on the roller 20 when described will also be a description of the curtain mounted on the roller 20'. Suitably attached along its edges to the roller 20 is a curtain 34 having a sleeve along its free edge for the reception of a reinforcing rod 35, a suitable fringe 36 depending from the sleeve for ornamental purposes.

This curtain comprises a main body portion which forms the center 37 of the curtain and has the flaps 38 and 39 which are illustrated clearly in Fig. 2. As shown in Fig. 2 the flap 38 is adapted for extending forwardly from the end of the roller 20 so as to afford a covering for the side of the forward part of the vehicle. The flap 39 is adapted for folding around the rear of the vehicle to assist in covering the rear portion of the vehicle. Mounted on the roller 24 is a curtain 40, the marginal edges 41 and 41' of which are adapted for folding inwardly upon the main body of the curtain 40, this main body being of a width equal to the length of the roller 24 so that in order to roll the curtain on the roller it is necessary that the side flaps 41 and 41' be folded upon the main body. Suitable snap fasteners 46 are provided on the flaps 41 and 41' to co-operate with snap fasteners 46' fastened on the main body 40 so that when the flaps 41 and 41' are folded upon the main body 40 they may be fastened in this folded over position. Mounted on the roller 30 is a curtain 42 which has side flaps 43 and 44 foldable upon the curtain proper in order to permit its rolling on the roller 30, these side flaps 43 and 44 when in use are folded outwardly to co-operate with the flaps 38 in entirely enclosing the forward part of the vehicle. The curtain 42 has on its inner surface snap fasteners 47 for co-operating with snap fasteners on the flap 38 so that the flaps 38 may be secured in position beneath the flaps 44, and 43, to cover the sides of the forward part of the vehicle. The side flaps 39 are also provided with snap fasteners co-operating with snap fasteners mounted on the side flaps 38 so that when these flaps are folded upon the curtain proper 37 they will be retained in their folded over position. With the curtains formed in the manner indicated a simple and effective method is provided for enclosing an automobile to protect it from the elements as set out.

The arrangement is one which permits the curtains to be quickly and easily raised and lowered and the various rollers are so connected as to co-operate together so that the curtains are all rolled on the rolls simultaneously and unrolled therefrom also simultaneously.

While I have illustrated and described the preferred form of structure I do not wish to limit myself to the precise form of structure shown but desire to avail myself of such variations and modifications as come within the scope of the appended claim.

Having thus described my invention, what I claim as new and desire to secure by Letters Patent is:

An auto top and cover of the class described comprising: a vehicle top having a pair of longitudinally extending pockets formed at opposite sides and a pair of transversely extending pockets formed at opposite ends, said transversely extending pockets communicating at their ends with said longitudinally extending pockets; a plurality of ledges on said top overhanging said pockets, the interior of said pockets being accessible beneath said ledges; a roller mounted in each of said pockets; gear wheels connecting said rollers for effecting a simultaneous rotation of each of said rollers; a crank for rotating said rollers from beneath said top; side curtains mounted on said longitudinally extending rollers, each of said side curtains having at its opposite edges tapered flaps, said flaps being foldable on the main body of said curtain preliminarily to rolling the same on said roller.

In testimony whereof I have signed the foregoing.

JOHN K. WRIGHT.